United States Patent [19]

Lee et al.

[11] 4,262,096

[45] Apr. 14, 1981

[54] RUBBER-MODIFIED TERPOLYMER WITH IMPROVED MOLDING CHARACTERISTICS

[75] Inventors: Yoon C. Lee; Quirino A. Trementozzi, both of Springfield, Mass.

[73] Assignee: Monsanto Company, St. Louis, Mo.

[21] Appl. No.: 50,023

[22] Filed: Jun. 18, 1979

Related U.S. Application Data

[60] Division of Ser. No. 948,122, Oct. 2, 1978, Pat. No. 4,223,096, which is a continuation-in-part of Ser. No. 865,049, Dec. 27, 1977, Pat. No. 4,197,376.

[51] Int. Cl.³ .......................................... C08F 279/02
[52] U.S. Cl. ................................. 525/285; 264/500; 264/502; 264/512; 525/315; 525/316
[58] Field of Search ............... 525/284, 285, 315, 316, 525/948, 122, 865, 649; 264/500, 512, 502

[56] References Cited

U.S. PATENT DOCUMENTS

| 3,267,061 | 8/1966 | Senior, Jr. et al. ...................... 260/8 |
| 3,919,354 | 11/1975 | Moore et al. ..................... 260/880 R |
| 4,108,925 | 8/1978 | Lee, Jr. ............................. 260/880 R |
| 4,141,934 | 2/1979 | Wingler et al. ......................... 525/53 |

*Primary Examiner*—J. Ziegler
*Attorney, Agent, or Firm*—David Bennett; William J. Farrington; Edward P. Grattan

[57] ABSTRACT

Rubber-modified terpolymers of from 50 to 83% of a monoalkenyl aromatic monomer, from 15 to 30% of an unsaturated dicarboxylic acid anhydride, from 2 to 20% of an unsaturated nitrile are described which are useful as molding compositions.

6 Claims, No Drawings

RUBBER-MODIFIED TERPOLYMER WITH IMPROVED MOLDING CHARACTERISTICS

This is a division of application Ser. No. 948,122, filed Oct. 2, 1978, now U.S. Pat. No. 4,223,096 application continuation-in-part of application Ser. No. 865,049, filed Dec. 27, 1977, now U.S. Pat. No. 4,197,376.

BACKGROUND OF THE INVENTION

This invention relates to molding compositions and particularly to molding compositions that cure during thermal treatment and which can nevertheless be thermoformed.

For most molding compositions based on thermoplastic polymers, the shaping operation does not involve any radical change in molecular structure, that is to say, it remains thermoplastic. The consequence of this thermoplastic character is that the mechanical properties such as modulus will decrease with increasing temperature and the polymer will usually have a low resistance to organic solvent such as might be used as paint vehicles for example.

If a thermosetting resin is chosen, the solvent and modulus deficiencies are considerably reduced but the resin cannot be thermoformed by conventional thermoplastic fabrication techniques. Furthermore, high modulus thermosetting resins all suffer from a lack of toughness which precludes their use in many applications. By contrast the polymers of the invention not only have good solvent resistance and high modulus but have in addition an unexpectedly high toughness.

The polymer compositions of the invention therefore, provide many of the advantages of both thermoplastic and thermosetting resins in that the polymers are tough and a broad range of thermoplastic forming operations can be used and the thermoformed polymer can be given good solvent resistance and retention of modulus by appropriate selection of reaction conditions.

The polymer is believed to acquire these properties through crosslinking and the amount that occurs can be controlled by variation of the composition of the polymer and the heat history of the polymer during processing.

The polymer of the invention thus provides a hybrid between true thermoplastic and thermosetting polymers that has many of the better characteristics of both.

DISCUSSION OF THE PRIOR ART

The copolymerization of styrene and acrylonitrile in the presence of a rubber is very well known in the art and indeed provides one process variant available for the production of the well known ABS polymer.

It is also known that styrene and maleic anhydride can be copolymerized in the presence of rubber and a process for producing such polymer is described in U.S. Pat. No. 3,919,354.

It is further known that the polymers described in U.S. Pat. No. 3,919,354 can in addition comprise a copolymerizable termonomer such as acrylonitrile in amounts from 10 to 40% and preferably from 20 to 35% of the polymer composition.

It is also known from U.S. Pat. No. 2,439,227 that styrene, maleic anhydride and acrylonitrile can be copolymerized in certain proportions to produce a high molecular weight polymer that possesses a good degree of tensile and flexural strength but very low impact strength. Such polymers cannot however, be readily formed as they rapidly become infusible at temperatures in excess of 120° C. and are thus inaccessible to normal shaping techniques and even polymer isolation operations involving heat treatment.

A polymer composition has now been found that can withstand the substantial heat treatments involved in the conventional drying and compounding of a thermoplastic polymer without becoming so crosslinked as to make it impossible to thermoform.

The compositions of the invention have remarkable resistance to solvents after being heat treated and retain their shear modulus even at elevated temperatures in a most unexpected fashion. In addition to the above advantages it is found that the polymers have excellent impact strength which greatly exceeds that which might have been expected on the basis of experience with analogous polymers.

Finally, the polymers have improved resistance to burning since on exposure to a flame they form a surface char which tends to inhibit the access of air to the combustion area.

DESCRIPTION OF THE INVENTION

The present invention provides a polymeric molding composition obtained by polymerizing a monomer mixture comprising from 50 to 83% of a vinylaromatic monomer, from 15 to 30% of an unsaturated discarboxylic acid anhydride and from 2 to 20% of an unsaturated nitrile, all percentages being by weight, in the presence of from 2 to 30 parts by weight, based on the weight of the polymer composition, of a rubber having a glass transition temperature below 0° C. which composition remains thermoformable after having been exposed to temperatures of 190° C. for 30 minutes and thereafter Brabender compounded for 2 minutes.

The invention further comprises a process for the production of a polymeric molding composition which comprises polymerizing from 50 to 83% by weight of a vinylaromatic monomer, from 15 to 30% by weight of an unsaturated dicarboxylic acid anhydride and from 2 to 20% by weight of an unsaturated nitrile in the presence of from 2 to 30% by weight of a rubber having a glass transition temperature below 0° C. to form a rubber substrate grafted with a superstrate terpolymer and dispersed in a matrix terpolymer; said process comprising forming a solution comprising a vinylaromatic monomer, the unsaturated nitrile monomer and the rubber; catalytically initiating polymerization of the mixture at a temperature below 120° C. with continuous addition of the unsaturated dicarboxylic acid anhydride during the polymerization reaction so as to produce a rubber modified terpolymer of uniform composition that remains thermoformable after having been exposed to temperatures of 190° C. for 30 minutes and thereafter Barbender compounded at 240° C. for 2 minutes.

It is understood that the majority of the polymers within the purview of this invention are capable of tolerating a heat history comprising heating at temperatures in excess of 190° C. for longer than 30 minutes followed by Brabender compounding at 240° C. for more than 2 minutes. These conditions are given as a threshhold heat history that a polymer must be able to tolerate and still remain thermoformable in order to be classed as polymeric compositions according to the present invention.

The compositions of the invention are therefore characterized by their ability to withstand considerable heat treatment without becoming crosslinked to the extent that they can no longer be thermoformed using standard commercial techniques. The un-modified polymers of U.S. Pat. No. 2,439,227 whose compositions are specified only in terms of monomers charged begin to crosslink at 120° C. and become infusible. It has been discovered that if the final polymer composition is maintained within certain limits and specifically if the unsaturated nitrile content is maintained below about 20%, the reaction conditions can be controlled such that a moldable composition is obtained that can be left at 120° C. for several days without rendering it infusible and which can in fact be exposed to drying conditions at 190° C. or more for at least 30 minutes followed by a Brabender compounding at 240° C. for a further 2 minutes and still be thermoformable under standard thermoplastic polymer molding conditions. This is indeed surprising and the advantageous results outlined above are shown by only a narrow range of compositions within the broad disclosure of the prior art.

What is more, it is important that the conditions of the reaction to produce the polymeric molding composition of the invention be carefully tailored towards their production by the use of a late addition technique for the anhydride component. It is found that straight mass polymerization techniques do not result in a uniform polymer because of the different reactivities of the monomers involved unless the composition falls within a very narrow range of azeotropic compositions. By the late addition technique the unsaturated dicarboxylic acid anhydride, which has a strong tendency to polymerize in a 1:1 ratio with the vinylaromatic monomer, is kept in low concentration and a rubber-modified terpolymer of uniform composition is formed.

The polymerization process should preferably be conducted at temperatures below about 120° C. and in practice this means that straight thermal polymerizations are disfavored. This is because they require higher temperatures or an undesirable combination of moderate temperatures maintained over a prolonged period.

The preferred processes of the invention therefore employ a catalytic initiator such as azobisisobutyronitrile or a perester such as tert-butyl peroctoate, tert-butyl peracetate or tert-butyl perbenzoate alone or in admixture. The reaction temperature is preferably maintained below about 120° C. and most preferably in the range of 85°–100° C. The total reaction time is generally from 5 to 10 hours such as from 5 to 8 hours.

The polymer is commonly produced in solution on account of the difficulty of introducing the anhydride component, though in some circumstances a viable mass polymerization process which does not require a solvent might be feasible.

The separation of the polymer from the solvent can be by any suitable means including precipitation and removal of volatile material by heating under reduced pressure.

During the polymerization of the monomers in the presence of the rubber, a minor proportion reacts to form a superstrate polymer grafted onto the substrate rubber. However, the major proportion of the monomers polymerize together to form a matrix polymer without becoming grafted to the substrate and it is understood that the polymeric composition of the invention comprises matrix polymer as well as grafted substrate rubber.

The polymerization method described above provides a technique for obtaining rubber-modified terpolymers but it does not guarantee that the polymers obtained will have the outstanding characteristics of the polymers of the invention. As the proportion of the unsaturated nitrile monomer in the composition rises, so too does the tendency of the composition to crosslink. This tendency can however, be controlled, up to a nitrile content of about 20% by precisely controlling the composition of the polymerizing mixture using the continuous monomer feed technique described above and by the use of chain transfer agents to maintain the matrix molecular weight at a suitable level. Generally it is desirable that the intrinsic viscosity of the matrix polymer by maintained within a range of 0.20 to about 0.65 and preferably from 0.35 to 0.65 deciliters/gram, measured at 25° C. in methyl ethyl ketone solution.

Suitable chain transfer agents include mercaptans such as tertiary dodecyl mercaptan; long chain unsaturated hydrocarbons such as terpinolene, myrcene, d-limonene or other terpene; norbornene, indene and other generally known chain transfer agents. The amount used is generally less than 1% by weight of the composition.

The rubber substrate component of the polymeric composition can be selected from a wide range of alternatives including butadiene polymers and copolymers, polyisoprene, polychloroprene, polyacrylate rubbers, and ethylene/propylene/diene rubber (EPDM), polypentenamer and ethylene/vinyl acetate rubbers. Copolymers of cyclopentene with a minor proportion of a non-cyclic α-olefin such as for example a copolymer of 55 to 95% of cyclopentene with from 5 to 45% of ethylene are particularly useful. Other rubbers which have a Tg below 0° C. and which may be grafted with the monomers used to produce the polymeric composition can readily be supplied by the skilled reader. The preferred rubbers have a Tg below about −30° C. and the most preferred are polybutadiene, especially the high-cis butadienes, and copolymers of butadiene with up to 40% by weight of a styrene or acrylonitrile comonomer.

The monoalkenyl aromatic monomer is preferably styrene but styrene derivatives such as chlorostyrene, vinyl toluene, alpha-methyl styrene, alpha-methyl vinyl toluene, 2,4-dichlorostyrene and 2-chloro-4-methylstyrene may be substituted for styrene in whole or in part if desired.

The unsaturated dicarboxylic acid anhydride is most preferably maleic anhydride though any of the homologues of maleic anhydride such as itaconic, citraconic, and aconitic anhydrides can also be used.

The preferred polymeric molding composition of the invention comprises a matrix polymer and dispersed therein a rubber substrate polymer having a glass transition temperature (Tg) below −30° C. with a superstrate polymer grafted thereon, wherein the matrix and superstrate polymers taken together comprise from 56–78% by weight of a monoalkenyl aromatic monomer; from 20–30% by weight of an unsaturated dicarboxylic acid anhydride and from 2 to 14% by weight of an unsaturated nitrile.

The preferred unsaturated nitrile monomers are acrylonitrile and methacrylonitrile. The preferred amount of the nitrile monomer in the superstrate/matrix polymer part of the composition is from 2 to 14 parts by weight since this gives a greater flexibility in pre-thermoforming processing, very good impact strength and distortion temperatures and sufficient crosslinking after thermoforming to give excellent shear modulus retention at high temperature.

The polymeric composition is conveniently prepared by dissolving the rubber in a solution of the monovinyl aromatic component and the unsaturated nitrile monomer in a suitable solvent, and then polymerizing the solution with late addition of the anhydride component in the manner described in, for example, U.S. Pat. No. 2,971,939, U.S. Pat. No. 3,336,267 and U.S. Pat. No. 3,919,354 which are incorporated herein by reference.

A polymerization schedule for the late addition of the anhydride may be devised on the basis of the relative reactivities of the monomers. Typical schedules involve preparing an initial reaction mixture comprising a solvent, the bulk of the alkenyl aromatic monomers, a very small amount (or none) of the anhydride monomer and the major proportion of the nitrile. The rubber is dissolved in this mixture and the balance of the monomers is added slowly during the polymerization.

The amount of rubber/substrate (ungrafted basis) in the polymeric composition, which as indicated above, includes both the grafted substrate and the matrix polymer, is in the range of from 2 to 30% by weight based on the weight of the polymeric composition. Preferably, however, the rubber substrate represents from 5 to 25% of the weight of the polymeric composition.

The composition can contain other additives such as for example, additional ungrafted rubber components, flame retardants, smoke suppressants, antioxidants, stabilizers, lubricants, antistatic additives, colorants and fillers such as glass fibers or mineral particles.

A wide range of antioxidant stabilizers for styrenic polymers is available but particularly satisfactory results can be obtained using 1,3,5-trimethyl-2,4,6-tris[3,5-ditert-butyl-4-hydroxybenzyl]benzene and 2,2'-methylene-bis-(4-methyl-6-tert-butyl phenol)terephthalate. The rubber component usually requires a different stabilizer such as a tris(alkylphenyl)phosphite though the prior art can supply others that would be effective.

The total amount of stabilizer that may be used is not critical but typically up to 5% by weight based on the total composition is found to be adequate. In general 0.1 to 2% is the range chosen for practical advantage.

DESCRIPTION OF THE PREFERRED EMBODIMENTS

The invention is now more particularly described with reference to the following examples which are for the purpose of illustration only and are intended to imply no limitation thereon.

EXAMPLE 1

This Example describes the process used to prepare a rubber modified polymer of styrene, maleic anhydride and acrylonitrile.

An agitated resin kettle was charged with 710 g of styrene, 54 g of acrylonitrile, 2.3 g terpinolene (a chain transfer agent) and a solvent mixture consisting of 300 g of methyl ethyl ketone (MEK) and 300 g of toluene. In this mixture were dissolved 90 g of polybutadiene rubber and 0.5 g trisnonylphenyl phosphite (a stabilizer). A solution of 23 g of maleic anhydride in 100 ml of MEK and a mixture of 0.2 cc of t-butyl peracetate and 0.3 cc of t-butyl peroctoate were then added to the above mixture. The temperature of the reaction mixture was raised to 85° C. and maintained at this level and continuous late addition of a solution of 144 g of maleic anhydride and 26 g acrylonitrile in 200 g MEK and 100 g toluene was initiated. The continuous late addition took place over a 6½ hour period.

A slug addition of 0.2 cc of t-butyl peracetate was made at 2 and again at 4 hours from the start of the continuous late addition. A sample of the polymer (designated A) was then separated from the solvent by placing the solution in an oven at 220°–230° C. for 1.5 hours under vacuum.

A further sample (designated B) of the same polymer was separated from unreacted monomer and solvent by precipitation from n-hexane at room temperature.

The ratio of the monomers styrene/maleic anhydride/acrylonitrile in the polymeric compositions was found to be 68/26/6 and the proportion of rubber was 14.3%. The dried polymers were then each compounded in a Brabender with 0.2 parts by weight of 1,3,5-trimethyl-2,4,6-tris(3,5-ditertiarybutyl-4-hydroxybenzyl)benzene (an antioxidant for the polymer) for 3 minutes at 240° C., after which they were compression molded at about 240°–250° C.

The shear modulus of each sample was then determined at temperatures of 25° C. and 120° C. The results obtained appear in Table 1 below. The shear modulus was determined using a mechanical spectrometer manufactured by Rheometrics, Inc. employing the standard procedure recommended by the manufacturer.

TABLE 1

| TEMPERATURE DEPENDANCE OF SHEAR MODULUS | | | |
|---|---|---|---|
| | | Shear Modulus (dynes/cm$^2$) | |
| | | 25° C. | 120° C. |
| RM-SMA | (76/24) | $8.9 \times 10^9$ | $4.7 \times 10^9$ |
| RM S/MA/AN | (68/26/6) Sample A | $10.1 \times 10^9$ | $7.0 \times 10^9$ |
| RM S/MA/AN | (68/26/6) Sample B | $10.1 \times 10^9$ | $7.2 \times 10^9$ |

The comparison of the polymeric composition of the invention with one containing no acrylonitrile is particularly instructive. Not only is the shear modulus substantially higher at both temperatures, but the retention of shear modulus at the elevated temperatures is very much better. This is somewhat surprising and is believed to result from crosslinking of the polymer chains during molding.

There is a further significant lesson from Table 1 in that the polymer that had been subjected to devolatilization in an oven under vacuum at 230° C. for 1.5 hours did not appear to be noticeably different from the sample (B), which had a much less severe heat history.

In the Examples that follow the basic preparative method used was that described in Example 1. The appropriate monomer addition schedule is derived from a computer model based on the monomer reactivities. Typical schedules are given in Table 2.

TABLE 2

| MONOMER ADDITION SCHEDULE RATIOS | | |
|---|---|---|
| TARGET POLYMER S/MA/AN | INITIAL CHARGE S/MA/AN | LATE ADDITION S/MA/AN |
| 60/30/10 (Ex. 1) | 60/4.7/18.7 | 0/25.3/1.3 |
| 63/25/12 | 63/3.3/10 | 0/21.7/2.0 |
| 65/20/15 | 65/2.6/13.1 | 0/17.4/1.9 |
| 67/17/16 | 67/2.0/13.6 | 0/15.0/2.4 |

In each case the amounts given are percentages based on the final polymer weight.

EXAMPLES 2–13

These Examples record the properties of polymers prepared by processes which were essentially the same as the one described in Example 1. Again for each composition one sample was prepared using oven devolatilization and another by precipitation from n-hexane. In both cases the same techniques were used as are set forth in Example 1 and the oven- and hexane-isolated samples are described as A and B, respectively.

The preparative conditions for each are set forth in Table 3 and the solubility properties of the polymers obtained appear in Table 4.

TABLE 3

PREPARATION OF RUBBER MODIFIED TERPOLYMERS

| Example | Composition S/MA/AN | Chain Transfer Agent (phr) | | % Rubber |
|---|---|---|---|---|
| *2 | 68/26/6 | 0.1 | Terpinolene | 14.3 |
| 3 | 66/28/6 | 0 | — | 15.8 |
| 4 | 68/26/6 | 0.23 | Terpinolene | 15.4 |
| 5 | 65/24/11 | 0.23 | Terpinolene | 16.0 |
| 6 | 69/20/11 | 0.23 | Tertiary dodecyl mercaptan | 14.0 |
| 7 | 66/23/11 | 0.46 | Terpinolene | 13.4 |
| 8 | 63/23/14 | 0 | — | 14.3 |
| 9 | 66/20/14 | 0.23 | Tertiary dodecyl mercaptan | 12.2 |
| 10 | 56/25/19 | 0 | — | 15.6 |
| 11 | 55/26/19 | 0.23 | Tertiary dodecyl mercaptan | 13.5 |
| +12 | 56/25/19 | 0 | — | 15.6 |
| 13 | 54/23/23 | 0.23 | Tertiary dodecyl mercaptan | 13.7 |

*Repeat of Example 1.
+Brabender compounded for 10 minutes instead of three minutes.

TABLE 4

SOLUBILITY PROPERTIES OF POLYMERIC COMPOSITIONS OF TABLE 3

| Example/Sample | | % AN | Solution Viscosity dl/g (1) | Solubility (2) Before | After |
|---|---|---|---|---|---|
| 2 | A | 6 | 0.55 | D | D |
|   | B | 6 | 0.52 | D | D |
| 3 | A | 6 | (Not measured) | D | D |
|   | B | 6 | 0.6 | D | D |
| 4 | A | 6 | 0.48 | D | D |
|   | B | 6 | 0.46 | D | D |
| 5 | A | 11 | 0.65 | D | PD |
|   | B | 11 | 0.60 | D | D |
| 6 | A | 11 | 0.50 | D | PD |
|   | B | 11 | 0.48 | D | D |
| 7 | A | 11 | 0.58 | D | D |
|   | B | 11 | 0.48 | D | D |
| 8 | A | 14 | Insol. | ND | ND |
|   | B | 14 | Insol. | PD | ND |
| 9 | A | 14 | — | PD | ND |
|   | B | 14 | — | PD | SS |
| 10 | A | 19 | — | SS | ND |
|    | B | 19 | — | PD | NS |
| 11 | A | 19 | — | S | ND |
|    | B | 19 | — | S | ND |
| 12 | A | 19 | — | SS | NDS |
| 13 | B | 23 | — | (3) | NDS |

(1) Solution viscosity in MEK (dl/g) as measured by the procedure described in ASTM D-2857.
(2) Solubility before and after molding. Determined by visual inspection after refluxing the sample in methyl ethyl ketone for 2 hours.
(3) Barely fusible. Cannot be satisfactorily thermoformed for measurement of physical properties. The product was highly discolored.
D = dispersible
ND = not dispersible
S = swells
SS = swells slightly
PD = partially dispersible
NDS = does not disperse or swell A sample of each polymer obtained was molded using standard compression molding techniques and the molded pieces were set aside for testing. The results of this testing are reported in Example 14. The solubility test was performed before and after the molding operation to show the effects of molding.

From Table 4 several significant facts emerge. The first is that as the AN content increases the tendency towards crosslinking increases as demonstrated by the behavior when attempts are made to disperse the polymer in boiling MEK. The solubility test is very severe indeed and indicates that the polymers characterized as ND are highly crosslinked.

The second point is that at the higher levels of AN the polymer can be molded under conventional compression molding conditions but that after molding it has become so crosslinked that it will no longer even swell. It should be noted that Example 12 which was brabendered for 10 minutes at 240° C. could still be molded though it was too crosslinked to give adequate fusion in the mold under the conditions used.

The third point is that even substantial amounts of chain transfer agent in Example 11 were unable to prevent crosslinking to the extent that the polymer could no longer be dispersed though it was still moldable.

Finally, it can readily be seen that above about 20% of acrylonitrile the crosslinking tendency becomes so strong that it becomes impossible to perform the necessary drying and compounding operation for the production of a polymer that is still capable of being formed by heat and pressure because the polymer has become completely crosslinked.

EXAMPLE 14

In this Example the impact strengths and DTUL of the polymers of Examples 2 to 11 are compared with the impact strength of a polymer containing about the same level of rubber but with no acrylonitrile. The results are set out in Table 5.

TABLE 5

PROPERTIES OF POLYMERS

| Example | Composition S/MA/AN | % Rubber | Polymer Separation | Izod (1) | DTUL (°C.) (2) |
|---|---|---|---|---|---|
| Comparative | 76/24/0 | 13.7 | A | 114 | 121 |
|    |         |      | B | 114 | 121 |
| 2 | 68/26/6 | 14.3 | A | 112 | 136 |
|   |         |      | B | 82  | 136 |
| 3 | 66/28/6 | 15.8 | A | 160 | 140 |
|   |         |      | B | 170 | 141 |
| 4 | 68/26/6 | 15.4 | A | 161 | 138 |
|   |         |      | B | 147 | 139 |
| 5 | 65/24/11 | 16.0 | A | 195 | 136 |
|   |         |      | B | 239 | 131 |
| 6 | 69/20/11 | 14.0 | A | 157 | 124 |
|   |         |      | B | 201 | 122 |
| 7 | 66/23/11 | 13.4 | A | 138 | 133.5 |
|   |         |      | B | 150 | 130.5 |
| 8 | 63/23/14 | 14.3 | A | (Not moldable) | |
|   |         |      | B | 151 | — |
| 9 | 66/20/14 | 12.2 | A | 185 | 126 |
|   |         |      | B | 131 | 125 |
| 10 | 56/25/19 | 15.6 | A | 170 | 135.5 |
|    |          |      | B | 181 | 135 |
| 11 | 56/25/19 | 13.5 | A | 174 | 136 |
|    |          |      | B | 175 | 136 |

(1) Notched Izod (J/m notch) as measured by the procedure described in ASTM D-256.
(2) Distortion Temperature under Load as measured by the procedure described in ASTM D-648.

From the data in Table 5 it can readily be seen that the Izod impact strength of the polymer rises rapidly with the acrylonitrile content. This in itself is remarkable since crosslinking has not been shown to improve toughness in any other known polymer system containing a rigid matrix.

From the above data it can be seen that the present invention defines a range of compositions within the broad disclosure of the prior art that have a unique capability for being thermoformed even after having been exposed to a substantial heat history during production. The narrow range of products thus defined also have unexpected and advantageous properties that are not predictable on the basis of the prior art and are not shared by the homologues containing larger amounts of unsaturated nitrile monomer.

The above Examples are for the purpose of illustration only and are not to be considered as implying any limitation on the essential scope of the invention. Minor variations and modifications of the compositions and processes described herein are considered to be within the purview of the invention.

What is claimed is:

1. A polymeric molding composition obtained by polymerizing a monomer mixture comprising from 50 to 83% of a vinylaromatic monomer, from 15 to 30% of an unsaturated dicarboxylic acid anhydride and from 2 to 20% of an unsaturated nitrile, all percentages being by weight, in the presence of from 2 to 30 parts by weight, based on the weight of the polymer composition, of a rubber having a glass transition temperature below 0° C. which composition remains thermoformable after having been exposed to temperatures of 190° C. for 30 minutes and thereafter Brabender compounded at 240° C. for 2 minutes.

2. A composition according to claim 1 in which the monomer mixture comprises from 2 to 14% of the unsaturated nitrile and from 20 to 30% of the anhydride.

3. A composition according to claim 1 in which the unsaturated nitrile is acrylonitrile.

4. A polymeric molding composition obtained by polymerizing a monomer mixture comprising from 56–78% by weight of styrene, from 20 to 30% by weight of maleic anhydride and from 2 to 14% by weight of acrylonitrile in the presence of from 2 to 30% by weight, based on the composition weight of a rubber having a glass transition temperature below −30° C. which composition remains thermoformable after having been exposed to temperatures of 220° C. for an hour and thereafter Brabender compounded for 10 minutes at 240° C.

5. A molded article having improved solvent resistance obtained by thermoforming a composition according to claim 1 and maintaining the article at an elevated temperature until such time that it is neither swelled nor dispersed by exposure to boiling methyl ethyl ketone.

6. A molded article having improved solvent resistance obtained by thermoforming a composition according to claim 4 and maintaining the article at an elevated temperature until such time that it is neither swelled nor dispersed by exposure to boiling methyl ethyl ketone.

* * * * *